(12) United States Patent
Adams et al.

(10) Patent No.: US 7,832,933 B2
(45) Date of Patent: Nov. 16, 2010

(54) WEAR RESISTANT FOIL BEARING ASSEMBLY

(75) Inventors: Robbie J. Adams, Phoenix, AZ (US); William L. Giesler, Phoenix, AZ (US); Don Takeuchi, Tempe, AZ (US); Eric Passman, Piscataway, NJ (US)

(73) Assignee: Honeywell International Inc., Morristown, NJ (US)

( * ) Notice: Subject to any disclaimer, the term of this patent is extended or adjusted under 35 U.S.C. 154(b) by 381 days.

(21) Appl. No.: 12/112,977

(22) Filed: Apr. 30, 2008

(65) Prior Publication Data

US 2009/0274401 A1 Nov. 5, 2009

(51) Int. Cl.
*F16C 32/06* (2006.01)
*F16C 33/12* (2006.01)

(52) U.S. Cl. ............... 384/103; 384/625; 384/913

(58) Field of Classification Search ......... 384/103–106, 384/625, 913, 912
See application file for complete search history.

(56) References Cited

U.S. PATENT DOCUMENTS

| | | | |
|---|---|---|---|
| 3,747,997 A | 7/1973 | Winn | |
| 3,781,071 A * | 12/1973 | Kauzlarich | .............. 384/108 |
| 4,459,047 A | 7/1984 | Silver | |
| 4,699,523 A | 10/1987 | Hagemeister | |
| 4,856,039 A | 8/1989 | Roelandse et al. | |
| 5,622,435 A | 4/1997 | Hiller et al. | |
| 5,624,191 A | 4/1997 | Fuchs et al. | |
| 6,158,893 A | 12/2000 | Heshmat | |
| 6,698,930 B2 | 3/2004 | Akizuki et al. | |
| 6,848,828 B2 | 2/2005 | Nishijima et al. | |
| 6,987,339 B2 | 1/2006 | Adams et al. | |
| 7,004,635 B1 | 2/2006 | Smith et al. | |
| 7,090,893 B1 * | 8/2006 | Divecha et al. | .......... 427/376.1 |
| 2007/0211970 A1 | 9/2007 | Nagata et al. | |
| 2010/0087346 A1 * | 4/2010 | Giesler et al. | .............. 508/123 |

* cited by examiner

*Primary Examiner*—Thomas R Hannon
(74) *Attorney, Agent, or Firm*—Ingrassia Fisher & Lorenz, P.C.

(57) ABSTRACT

A foil bearing assembly for supporting a rotating member that rotates about an axis including a stationary mount member spaced from the rotating member so that a gap is defined between the stationary mount member and the rotating member. A foil member is disposed in the gap between the rotating member and the stationary mount member. At least one of the rotating member, the stationary mount member or the foil member includes a wear resistant coating layer.

25 Claims, 3 Drawing Sheets

WEAR RESISTANT FOIL BEARING ASSEMBLY

TECHNICAL FIELD

The inventive subject matter generally relates to engine components for use in high temperature environments, and more particularly relates to a wear resistant foil bearing assembly.

BACKGROUND

Foil bearings may be used to support rotating components of turbine engines, turbochargers, and the like. Generally, a foil bearing includes a journal mounted to the rotating component and a cylindrical top foil disposed around the journal. The journal and top foil are configured such that when the rotating component rotates at an optimum operational speed, the foil and the journal separate from each other to form an air gap. As the air gap between the foil and the journal grows, pressurized air is drawn in to serve as a lubricant to the rotating component and surrounding static components.

In the absence of the pressurized air between the journal and the top foil, the two components may come into contact with each other or with other surrounding components resulting in component wear. In addition, heat generated during operation of the foil bearing may result in component wear. Thus, to reduce wear and heat generation during operation of the foil bearing, a wear resistance system may be employed.

In one type of wear resistance system, the journal or cylindrical top foil may be coated with or made of a wear resistant material. Recently, it has been discovered that rhenium has superior wear resistant properties over other materials of this type. Although components could be made entirely of rhenium, such an option may not be available in applications in which cost may be a constraint.

Accordingly, it is desirable to provide a foil bearing including component parts having a wear resistant coating layer formed on contacting surfaces thereof and a method for coating the wear resistant coating layer onto the component parts. In addition, it is desirable for the method to be relatively low cost and simple to perform. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

The invention described in this disclosure supports the creation of an improved wear resistant foil bearing assembly that is resistant to high heat and wear generated during typical operation and a method of forming the wear resistant components of the foil bearing assembly.

In one particular embodiment, and by way of example only, there is provided a foil bearing assembly for supporting a rotating member that rotates about an axis. The foil bearing assembly comprising a stationary mount member and a foil member. The stationary mount member is spaced from the rotating member so that a gap is defined between the stationary mount member and the rotating member. The foil member is disposed in the gap between the rotating member and the stationary mount member to support the rotating member via a fluid film when the rotating member rotates. At least one of the stationary mount member, the rotating member or the foil member includes a wear resistant coating layer formed of a refractory material including rhenium.

In yet another embodiment, and by way of example only, there is provided a foil bearing assembly for supporting a rotating member configured to rotate about an axis, the assembly comprising a stationary mount member spaced from the rotating member so that a gap is defined between the stationary mount member and the rotating member and a foil member. The rotating member is arranged for relative coaxial rotation with respect to the stationary mount member. The foil member is disposed in the gap between the rotating member and the stationary mount member. At least one of the stationary mount member, the rotating member and the foil member includes a wear resistant coating layer formed of a refractory material including a largest constituent being rhenium by atomic percent.

In yet another embodiment, and by way of example only, there is provided a foil bearing assembly for supporting a rotating member configured to rotate about an axis, the foil bearing assembly comprising a stationary mount member spaced from the rotating member so that a gap is defined between the stationary mount member and the rotating member and a foil member. The stationary mount member including a bore formed therein. The rotating member is disposed within the bore and arranged for relative coaxial rotation with respect to the stationary mount member. The foil member is disposed in the gap between the rotating member and the stationary mount member. At least one of the bore and the foil member includes a substrate and a wear resistant coating layer formed of a refractory material selected from a group consisting of elemental rhenium, a rhenium alloy, a rhenium nitride, rhenium boride and rhenium fluoride disposed on an intermediate bonding layer, the intermediate bonding layer disposed on a substrate material.

Other independent features and advantages of the preferred assemblies and methods will become apparent from the following detailed description, taken in conjunction with the accompanying drawings which illustrate, by way of example, the principles of the inventive subject matter.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
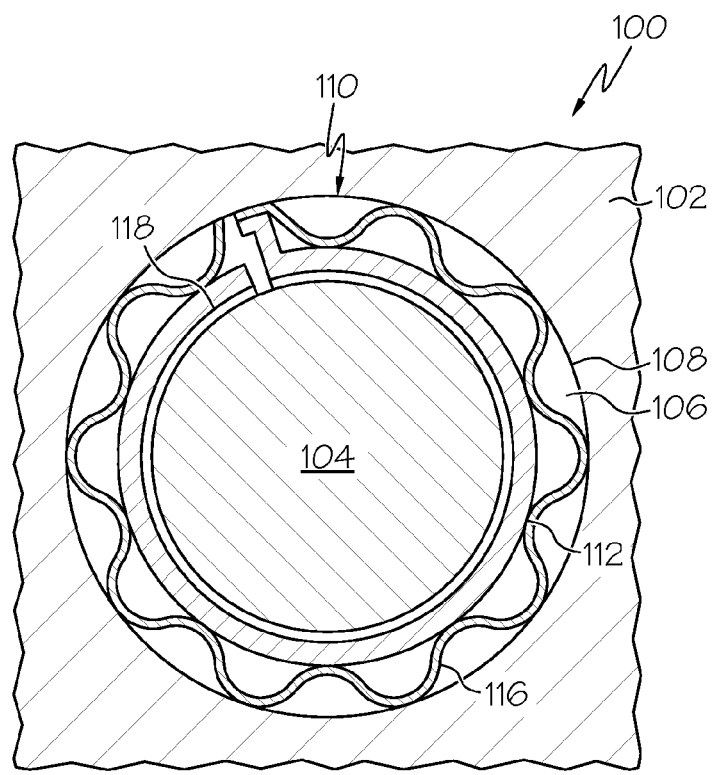
FIG. 1 is a cross section view of a foil bearing assembly, according to an embodiment.

FIG. 1 is a cross section view of a bearing assembly 100 for supporting a rotating member 104 that rotates about an axis, according to an embodiment. In this particular embodiment, the bearing assembly 100 is a foil journal bearing assembly, but alternatively may be another type of bearing including, but not limited to, a multi-leaf journal bearing, a thrust bearing, or the like. The bearing assembly 100 comprises a stationary mount member 102 having a bore 106 formed therein. The rotating member 104 is disposed within the bore 106. In this particular embodiment, the stationary mount member 102 comprises a journal member and the rotating member 104 comprises a shaft having a substantially cylindrical portion, such as a shaft of a turbine engine. The bore 106 is typically of circular cross-section and has an inner diameter 108. The rotating member 104 may be arranged for relative coaxial rotation with respect to the stationary mount member 102 with a foil bearing 110 disposed between the shaft 104 and the journal member 102.

The foil bearing 110 includes a foil member 112 that is disposed between the rotating member 104 and the stationary mount member 102. The foil member 112 may be formed of a thin, compliant material, having a radius of curvature that is smaller than the radius of curvature of the inner diameter 108 of the stationary mount member 102. The foil member 112 may include a means for preventing rotation or telescoping of the foil member 112 during operation of the foil bearing 110. The foil member 112 may be made from any material suitable for extreme temperatures, resistance to corrosion, and other extreme conditions. Suitable materials include nickel, cobalt, iron, and alloys thereof as well as beryllium-copper, carbon fiber and stainless steel. In this particular embodiment, a single top foil is illustrated, but it should be understood that multi-foil systems are anticipated by this disclosure.

The foil bearing 110 may further include an underspring 114 formed of a thin compliant material, having a radius of curvature that is smaller than the radius of curvature of the stationary mount member 102 but larger than the radius of curvature of the foil member 112. The underspring 114 may include a means for preventing rotation or telescoping of the underspring 114 during operation of the foil bearing 110. The underspring 114 may optionally include corrugations 116 to accommodate expansion, excursions, and any misalignment. The underspring 114 may be made from the same material as the foil member 112 or from any material suitable for extreme conditions, such as increased load capacity at high speeds while being subjected to high temperature, for example, in excess of 650 degrees F. and resistance to corrosion. In an alternate embodiment, additional undersprings, similar to underspring 114, may be disposed between the underspring 114 and the stationary mount member 102. The stationary mount member 102 surrounds the rotating member 104, or shaft, so that a gap 118 is formed as an annular fluid film gap defined between the cylindrical surface of the cylindrical portion of the rotating member 104 and the foil member 112. The underspring 114 provides the preload against the foil member 112, helps control the size of the gap 118 between the rotating member 104 and the foil member 112, and maintains the foil member 112 in its proper location.

During operation, the rotating member 104, the foil member 112 and the underspring 114 may be contacted against each other while subjected to extreme contact stress and/or extreme pressure-velocity values. To prevent galling and seizing of the rotating member 104 and the foil member 112 and the underspring 114 when subjected to the aforementioned conditions, the foil member 112 may include a wear resistant material. For example, the foil member 112 may have outer surfaces that may be coated with the wear resistant material. A cross-sectional view of a portion of a wear resistant foil bearing 200, generally similar to the foil bearing 110 of FIG. 1, is provided in FIG. 2. In the embodiment illustrated in FIG. 2, a foil member 202, generally similar to the foil member 112 of FIG. 1, may include a substrate 204 and a wear resistant coating layer 206 disposed on an interior surface 208 of the foil member 202. The substrate 204 may be made of any material conventionally used for bearing assembly components, and more particularly top foils of foil bearing assemblies. As previously stated, suitable materials include, but are not limited to nickel, cobalt, iron, and alloys thereof as well as beryllium-copper, carbon fiber and stainless steel. Moreover, in an embodiment, the substrate 204 may have a thickness of between about 1.5 mm and about 25.0 mm. In other embodiments, the substrate 204 may be thinner or thicker.

As previously stated, the wear resistant coating layer 206 is deposited on the interior surface 208 of the foil member 202, between the substrate 204 of the foil member 202 and the rotating member 104. The wear resistant coating layer 206 is comprised of a material having a higher melting point than that of the material forming the substrate 204 of the foil member 202. In an embodiment the wear resistant coating layer 206 is comprised of a refractory material including a largest constituent being rhenium by atomic percent.

The refractory material herein described includes rhenium as the largest constituent by atomic percent, which may include, but is not limited to, elemental rhenium, rhenium alloys, rhenium nitride, rhenium fluoride, rhenium boride, and oxidizing resistant rhenium alloys where the alloy includes an oxidation resistant substance, such as soluble metals, that attract oxygen and may form a protective layer over the remaining portion of the rhenium alloy wear resistant coating layer. Such soluble alloying constituents may include, but are not limited to, chromium, cobalt, nickel, titanium, thorium, aluminum, hafnium, vanadium, silicon, aluminum, and rare earth metals, such as yttrium, lanthanum, and cerium. Oxidizing resistant rhenium alloys are further described in U.S. Pat. Nos. 6,773,663 and 6,749,803, assigned to the same assignee, and incorporated herein by this reference. The inclusion of a refractory material including the largest constituent being rhenium by atomic percent may provide not only high heat resistance, but a more wear resistant surface at a foil member/rotating member interface 210.

As previously stated, the wear resistant coating layer 206 is disposed over the substrate 204 to provide improved heat resistance, wear-resistance, and gall-resistance when subjected to extreme contact stress and extreme pressure-velocity values. In the embodiment illustrated in FIG. 2, the wear resistant coating layer 206 is comprised of substantially pure rhenium disposed on a nickel substrate 204 that forms the structure of the foil member 202. "Pure rhenium" as used herein, may be defined as rhenium having a purity of at least 99%, by atomic percent. In an embodiment, the pure rhenium has a purity of at least 99%, by atomic percent, and may include incidental impurities in trace amounts. In another embodiment, the pure rhenium has a purity of at least 99.99%, by atomic percent. In still another embodiment, the pure rhenium has a purity of 100%, by atomic percent. The wear resistant coating layer 206 may have a thickness of between about 0.20 mm and about 1.30 mm. However, in other embodiments, the wear resistant coating layer 206 may be thinner or thicker, depending on a particular magnitude of contact stress and/or a particular pressure-velocity value to which the wear resistant coating layer 206 may be subjected.

Figure 2:
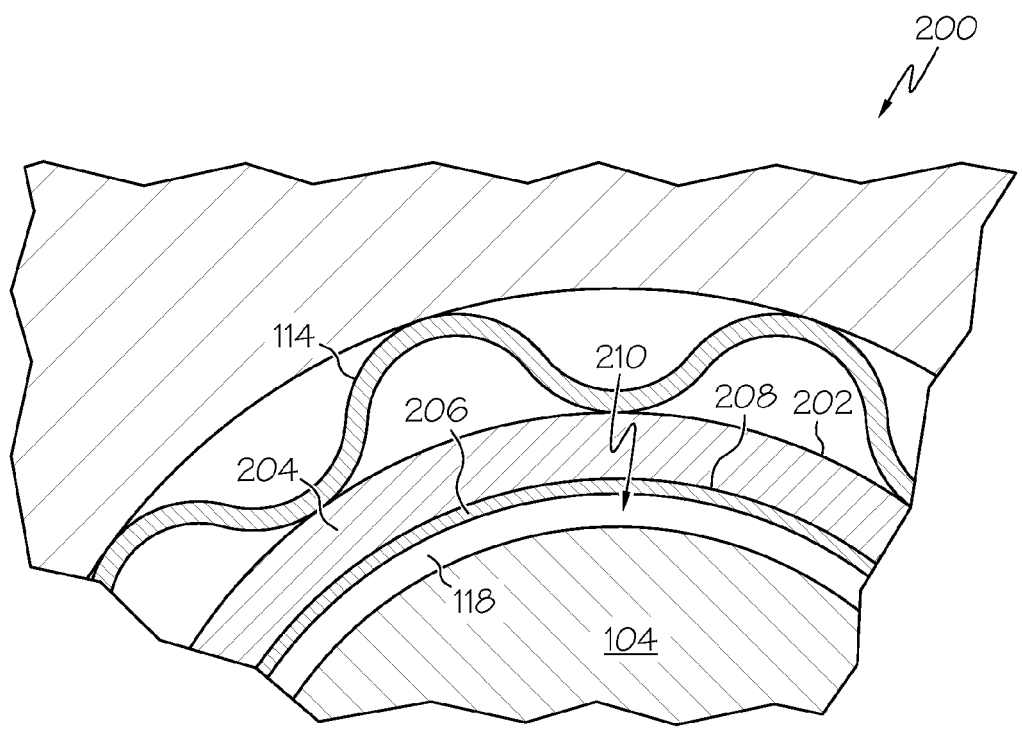
FIG. 2 is a simplified cross view of a portion of the foil bearing assembly, according to an embodiment.
Figure 3:
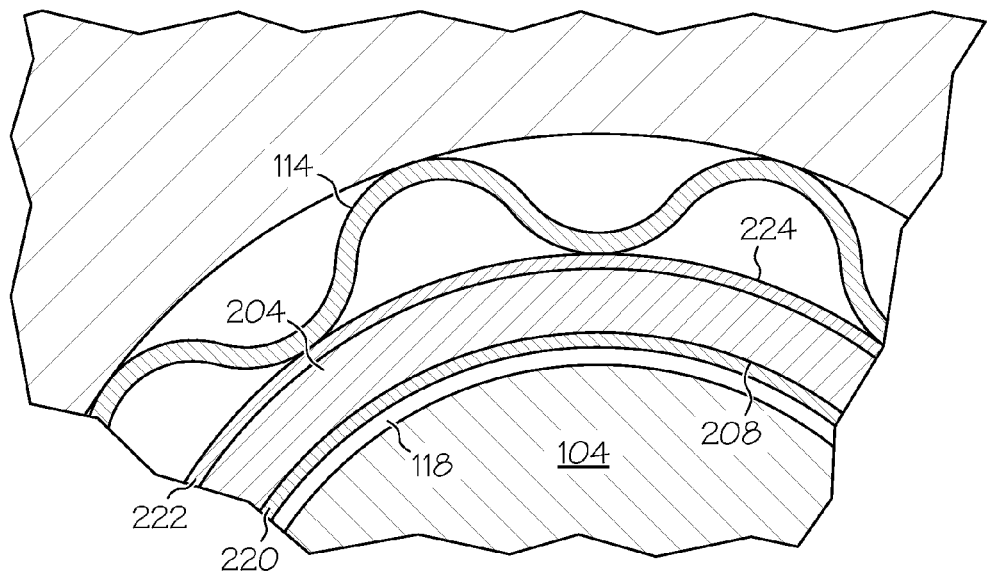
FIG. 3 is a simplified cross view of a portion of a foil bearing assembly, according to an embodiment.

In an alternative embodiment best illustrated in FIG. 3, the substrate 204 of the foil member 202 includes a first wear resistant coating layer 220 disposed on an interior surface 208 of the foil member 202, generally similar to wear resistant coating layer 206 of FIG. 2, and a second wear resistant coating layer 222 disposed on an exterior surface 224 of the foil member 202. More particularly, the second wear resistant coating layer 222 is disposed between the substrate 204 of the foil member 202 and the underspring 114.

In yet further alternative embodiments, the underspring 114 may be coated with a wear resistant coating layer comprised of a refractory metal on its interior and/or exterior diameters, as well as the interior diameter of the stationary mount member 102, and more particularly the surface of the bore 106, and the exterior diameter of the rotating member 104. It is anticipated that any combination of coating layers of a refractory metal may be utilized to provide wear resistance properties to the contacting components of the foil bearing assembly 100.

Figure 4:
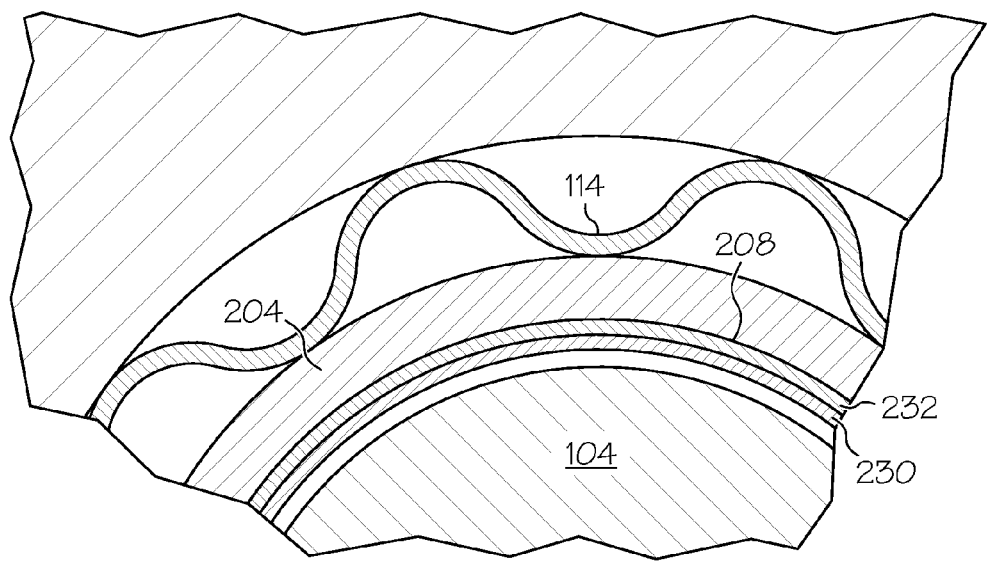
FIG. 4 is a simplified cross view of a portion of a foil bearing assembly, according to an embodiment.

In yet another alternative embodiment best illustrated in FIG. 4, an intermediate bonding layer 232, such as nickel or cobalt, may be included between a wear resistant coating layer 230, generally similar to wear resistant coating layer 206 of FIG. 2 and the substrate 204 to improve adhesion between the materials that form the substrate 204 of the foil member 202 and the wear resistant coating layer 230. The intermediate bonding layer 232 bonds the wear resistant coating layer 230 to the substrate 204 and may comprise a eutectic alloy that may include a base alloy and one or more melting point depressants. In an embodiment, the base alloy is selected to be chemically compatible with the substrate material and the material comprising the wear resistant coating layer 230 (e.g., rhenium). For example, the base alloy may be nickel, as nickel is capable of bonding to conventionally-used substrate materials (e.g., nickel-based alloys, cobalt-based alloys, iron-based alloys, etc.) and is soluble in rhenium. In other embodiments, different elements may be selected as the base alloy. The one or more melting point depressants are selected to allow the eutectic alloy to have a melting temperature that is lower than a melting temperature of the substrate material and a melting temperature of rhenium. Additionally, the particular depressant selected may depend on the base alloy to be included in the eutectic alloy. For example, in a formulation in which nickel is used as the base alloy, suitable melting point depressants include phosphorus and boron. In other examples, other melting point depressants may alternatively be used.

The eutectic alloy may include the base alloy and the melting point depressants at any ratio suitable to form a eutectic, where "eutectic" is defined as a composition for a binary alloy system where an equilibrium melting temperature is below that of either or both of the alloy and depressant in pure form (e.g. greater than 99% purity) and where both phases of the alloy and the depressant melt at the same temperature. The intermediate bonding layer 232 may be thinner than the wear resistant coating layer 230, in an embodiment. For example, the intermediate bonding layer 232 may have a thickness of between about 0.0003 mm and about 0.005 mm. In other embodiments, it will be appreciated that the intermediate bonding layer 232 may be thicker or thinner than the ranges mentioned.

Alternative embodiments may include a combination of refractory metals, such as a rhenium-tungsten, molybdenum rhenium, other rhenium alloys forming the wear resistant coating layers 206, 220, 222 and 230. In addition, the intermediate bonding layer 232 may be formed of a material that is soluble in both the alloy and the material forming the substrate 204 that forms the structure of the foil member 202. In still further embodiments, rhenium or a rhenium alloy may be used as the material forming the substrate 204 that forms the foil member 202 in that it is a high temperature, wear resistant material. The rhenium substrate may be coated with a single layer or multiple layers of an intermediate bonding material to enhance the composite properties, coated with only a single layer of a wear resistant coating layer material, or left uncoated. The disclosed combination of materials and multiple layers provides for the high heat and wear resistant properties of the contacting components that comprise the bearing assembly 100 and more particularly the foil bearing 110.

Figure 5:
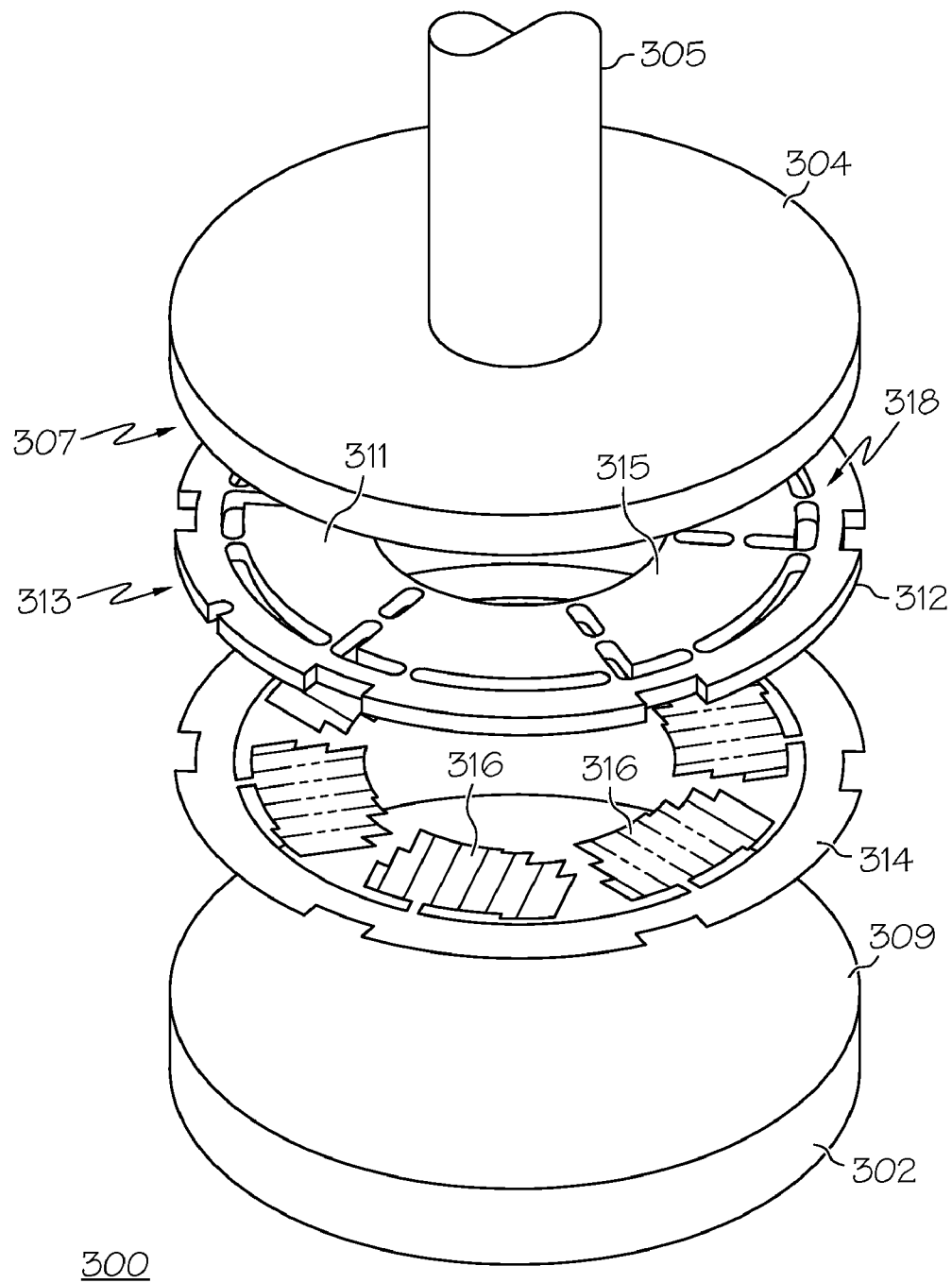
FIG. 5 is a cross section view of a foil bearing assembly, according to another embodiment.

Referring now to FIG. 5, is a cross section view of a bearing assembly 300 for supporting a rotating member 304 that rotates about an axis, according to an alternate embodiment. The bearing assembly 300 is a foil thrust bearing assembly typically found in high speed rotating machinery, such as turboalternator-generators, turbocompressors, and motor driven compressors. The bearing assembly 300 comprises a stationary mount member 302, a rotating member 304 and a foil member 312. In this particular embodiment, the stationary mount member 302 is typically referred to as a thrust plate or housing and the rotating member 304 may comprise a disk-shaped member, typically referred to as a thrust runner. The rotating member 304 may be coupled to a rotating shaft 305, thereby causing the rotating member 304 to rotate. The rotating member 304 may include a runner surface 307 that faces opposite a bearing surface 309 of the stationary mount member 302. Positioned between the rotating member 304 and the stationary mount member 302 is the foil member 312, also referred to as a thrust bearing disc.

The foil bearing assembly 300 may include an underspring 314 formed of a thin compliant material. The underspring 314 may optionally include corrugations 316 to accommodate expansion, excursions, and any misalignment. The underspring 314 may be made from the same material as the foil member 312 or from any material suitable for extreme conditions, such as increased load capacity at high speeds while being subjected to high temperature. In an alternate embodiment, additional undersprings, similar to underspring 314, may be disposed between the underspring 314 and the stationary mount member 302. The stationary mount member 302 is positioned relative to the rotating member 304 so that a gap 318 is formed as a fluid film gap defined between a planar surface, and more particularly the runner surface 307 of the rotating member 304 and the stationary mount member 302, and more particularly between the rotating member 304 and the foil member 312. The underspring 314 provides the preload against the foil member 312, helps control the size of the gap 318 between the rotating member 304 and the foil member 312, and maintains the foil member 312 in its proper location.

During operation, the rotating member 304, the foil member 312 and the underspring 314 may be contacted against each other while subjected to extreme contact stress and/or extreme pressure-velocity values. To prevent galling and seizing of the rotating member 304 and the foil member 312 and the underspring 314 when subjected to the aforementioned conditions, the foil member 312 may include a wear resistant material. For example, the foil member 312 may have outer planar surfaces 311 and 313 that may be coated with the wear resistant material 315. More particularly, the foil member 312 may include a substrate having a wear resistant coating layer 315 disposed on planar surfaces 311 and 313. Similar to the previously disclosed foil journal bearing, the substrate may be made of any material conventionally used for bearing assembly components, and more particularly top foils of foil bearing assemblies.

As previously stated, the wear resistant coating layer 315 is deposited on the planar surfaces 311 and/or 313 of the foil member 312, between the substrate of the foil member 312 and the rotating member 304 and/or between the substrate of the foil member 312 and the underspring 314. The wear resistant coating layer 315 is comprised of a material having a higher melting point than that of the material forming the substrate of the foil member 312. In an embodiment, the wear resistant coating layer 315 is comprised of a refractory material such as those previously described with respect to the disclosed foil journal bearing of FIGS. 1-4. In addition, optional intermediate bonding layers may be included as previously described.

In an alternate embodiment of the foil bearing assembly 300, additional planar surfaces may be coated with the wear resistant coating layer 315, such as the runner surface 307 of the rotating member 304 and/or the bearing surface 309 of the stationary mount member 302.

To fabricate the wear resistant coating layer disclosed in the various embodiments, as well as the optional intermediate bonding layer, various deposition methods may be utilized, such as chemical vapor deposition, physical vapor deposition, laser coating, electro-chemical deposition, powder metallurgy techniques such as HIPing or axial loading, IFF, or any other deposition methods commonly known in the art.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A foil bearing assembly for supporting a rotating member that rotates about an axis, the foil bearing assembly comprising:
    a stationary mount member spaced from the rotating member so that a gap is defined between the stationary mount member and the rotating member; and
    a foil member disposed in the gap between the rotating member and the stationary mount member to support the rotating member via a fluid film when the rotating member rotates,
    wherein at least one of the stationary mount member, the rotating member and the foil member includes a wear resistant coating layer formed of a refractory material including rhenium.

2. A foil bearing assembly as claimed in claim 1, wherein the rotating member comprises a shaft having a substantially cylindrical portion, and the stationary mount member surrounds the shaft so that the gap is formed as an annular gap defined between a cylindrical surface of the substantially cylindrical portion of the shaft and the stationary mount member.

3. A foil bearing assembly as claimed in claim 2, wherein the foil bearing assembly constitutes a journal bearing.

4. A foil bearing assembly as claimed in claim 1, wherein the rotating member comprises a disk-shaped member and the gap is defined between the stationary mount member and a planar surface of the disk-shaped member.

5. A foil bearing assembly as claimed in claim 4, wherein the foil bearing assembly constitutes a thrust bearing.

6. A foil bearing assembly as claimed in claim 1, wherein the refractory material includes a largest constituent being rhenium by atomic percent.

7. A foil bearing assembly as claimed in claim 6, wherein the refractory material is pure rhenium.

8. A foil bearing assembly as claimed in claim 6, wherein the refractory material is selected from a group consisting of elemental rhenium, a rhenium alloy, a rhenium nitride, rhenium boride and rhenium fluoride.

9. A foil bearing assembly as claimed in claim 8, wherein the rhenium alloy includes an alloying substance with an affinity for oxidizing substances.

10. A foil bearing assembly as claimed in claim 9, wherein the alloying substance having an affinity for oxidizing substances includes at least one of chromium, cobalt, nickel, titanium, thorium, aluminum, hafnium, vanadium, silicon, aluminum, and a rare earth metal.

11. A foil bearing assembly as claimed in claim 1, wherein the foil member is comprised of a solid sheet of the refractory material.

12. A foil bearing assembly as claimed in claim 1, wherein the wear resistant coating layer is formed on at least one of an interior diameter, an exterior diameter, and a planar surface of at least one of the rotating member, the stationary mount member and the foil member.

13. A foil bearing assembly as claimed in claim 1, wherein the wear resistant coating layer is disposed over a substrate material of at least one of nickel, cobalt, iron, or alloy thereof.

14. A foil bearing assembly as claimed in claim 13, wherein the wear resistant coating layer is disposed on an intermediate bonding layer, the intermediate bonding layer disposed on the substrate material.

15. A foil bearing assembly as claimed in claim 14, wherein the intermediate bonding layer is a eutectic alloy.

16. A foil bearing assembly for supporting a rotating member configured to rotate about an axis, the foil bearing assembly comprising:
    a stationary mount member spaced from the rotating member so that a gap is defined between the stationary mount member and the rotating member, the rotating member arranged for relative coaxial rotation with respect to the stationary mount member;
    a foil member disposed in the gap between the rotating member and the stationary mount member;
    wherein at least one of the stationary mount member, the rotating member and the foil member includes a wear resistant coating layer formed of a refractory material including a largest constituent being rhenium by atomic percent.

17. A foil bearing assembly as claimed in claim 16, constitutes a journal bearing wherein the rotating member comprises a shaft having a substantially cylindrical portion, and the stationary mount member surrounds the shaft so that the gap is formed as an annular gap defined between a cylindrical surface of the substantially cylindrical portion of the shaft and the stationary mount member.

18. A foil bearing assembly as claimed in claim 16, wherein foil bearing constitutes a thrust bearing wherein the rotating member comprises a disk-shaped member and the gap is defined between the stationary mount member and a planar surface of the disk-shaped member.

19. A foil bearing assembly as claimed in claim 16, wherein the refractory material is pure rhenium.

20. A foil bearing assembly as claimed in claim 16, wherein the refractory material is selected from a group consisting of elemental rhenium, a rhenium alloy, a rhenium nitride, rhenium boride and rhenium fluoride.

21. A foil bearing assembly as claimed in claim 20, wherein the rhenium alloy includes an alloying substance with an affinity for oxidizing substances.

22. A foil bearing assembly as claimed in claim 16, wherein the wear resistant coating layer is formed on an interior diameter of a bore formed in the stationary mount member.

23. A foil bearing assembly as claimed in claim 16, wherein the wear resistant coating layer is formed on at least one of an interior diameter, an exterior diameter, and a planar surface of at least one of the rotating member, the stationary mount member and the foil member.

24. A foil bearing assembly as claimed in claim 16, wherein the wear resistant coating layer is disposed on an intermediate bonding layer, the intermediate bonding layer disposed on a substrate material.

25. A foil bearing assembly for supporting a rotating member configured to rotate about an axis, the foil bearing assembly comprising:

a stationary mount member spaced from the rotating member so that a gap is defined between the stationary mount member and the rotating member, the stationary mount member including a bore formed therein, the rotating member disposed within the bore and arranged for relative coaxial rotation with respect to the stationary mount member; and a foil member disposed in the gap between the rotating member and the stationary mount member;

wherein at least one of the bore and the foil member includes a substrate and a wear resistant coating layer formed of a refractory material selected from a group consisting of elemental rhenium, a rhenium alloy, a rhenium nitride, rhenium boride and rhenium fluoride disposed on an intermediate bonding layer, the intermediate bonding layer disposed on a substrate material.

* * * * *